United States Patent
Bian et al.

(10) Patent No.: US 10,871,614 B1
(45) Date of Patent: Dec. 22, 2020

(54) TRANSVERSE-ELECTRIC (TE) PASS POLARIZER

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/502,667

(22) Filed: Jul. 3, 2019

(51) Int. Cl.
*G02B 6/126* (2006.01)
*G02B 6/12* (2006.01)
*G02B 6/136* (2006.01)

(52) U.S. Cl.
CPC .............. *G02B 6/126* (2013.01); *G02B 6/136* (2013.01); *G02B 2006/12038* (2013.01); *G02B 2006/12061* (2013.01); *G02B 2006/12116* (2013.01); *G02B 2006/12152* (2013.01)

(58) Field of Classification Search
CPC .................... G02B 6/126; G02B 6/136; G02B 2006/12038; G02B 2006/12061; G02B 2006/12152; G02B 2006/12116
See application file for complete search history.

(56) References Cited

U.S. PATENT DOCUMENTS

| | | | |
|---|---|---|---|
| 4,697,868 A | 10/1987 | Thanivavarn | |
| 6,330,388 B1 | 12/2001 | Bendett et al. | |
| 6,891,983 B2 | 5/2005 | Hammer | |
| 8,873,894 B2* | 10/2014 | Kim | G02B 6/00 385/2 |
| 9,470,844 B1 | 10/2016 | Ma et al. | |
| 9,893,219 B2* | 2/2018 | Suzuki | G02F 1/025 |
| 10,191,215 B2 | 1/2019 | Kippenberg et al. | |
| 10,215,920 B2 | 2/2019 | Ma et al. | |
| 10,241,267 B2 | 3/2019 | Kiyota et al. | |
| 10,564,512 B2* | 2/2020 | Sun | G02F 1/3132 |
| 2008/0285610 A1 | 11/2008 | Hall et al. | |
| 2015/0372159 A1* | 12/2015 | Englund | G01J 3/18 356/328 |

FOREIGN PATENT DOCUMENTS

WO     2008/117249 A1    10/2008

OTHER PUBLICATIONS

Belt and Blumenthal, "Erbium-doped waveguide DBR and DFB laser arrays integrated within an ultra-low-loss Si3N4 platform," Optics Express, 22:10655-60, May 5, 2014.
Bian et al., "Hybrid vanadata waveguiding configurations for extreme optical confinement and efficient polarization management in the near-infrared," Nanoscale, 10:16667-74, 2018.

(Continued)

*Primary Examiner* — Ryan A Lepisto
(74) *Attorney, Agent, or Firm* — Anthony Canale; Hoffman Warnick LLC

(57) ABSTRACT

One illustrative TE pass polarizer disclosed herein includes an input/output layer, a first buffer layer positioned above at least a portion of the input/output layer, a layer of epsilon-near-zero (ENZ) material positioned above at least a portion of the first buffer layer, and a metal-containing capping layer positioned above at least a portion of the layer of ENZ material.

20 Claims, 11 Drawing Sheets

(56) References Cited

OTHER PUBLICATIONS

Dai et al., "Compact broadband polarizer based on shallowly-etched silicon-on-insulator ridge optical waveguides," Optics Express, 18:27404-15, Dec. 20, 2010.
De Oliveira and de Matos, "Graphene Based Waveguide Polarizers: In-Depth Physical Analysis and Relevant Parameters," Scientific Reports, 5:16949, Nov. 19, 2015.
Edwards et al., "Experimental Verification of Epsilon-Near-Zero Metamaterial Coupling and Energy Squeezing Using a Microwave Waveguide," Physical Review Letters, 100:033903, 2008.
Huang et al., "CMOS compatible horizontal nanoplasmonic slot waveguides TE-pass polarizer on silicon-on-insulator platform," Optics Express, 21:12790-96, May 20, 2013.
Liberal and Engheta, "Near-zero refractive index photonics," Nature Photonics, 11:149-58, Mar. 2017.
Maas et al., "Experimental realization of an epsilon-near-zero metamaterial at visible wavelengths," Nature Photonics, published online Oct. 13, 2013.
Maes et al., "3.4 W Monolithic Erbium-Doped All-Fiber Laser at 3.55 um," 2017 Crown.
Peled et al., "Monolithic rare-earth doped sol-gel tapered rib waveguide laser," Applied Physics Letters, 92:221104, 2008.
Polman, "Energy transfer in erbium doped optical waveguides based on silicon," ISBN 90-393-2491-3.
Pumawirman et al., "C- and L-band erbium-doped waveguide lasers with wafer-scale silicon nitride cavities," Opticals Letters, 38:1760-62, Jun. 1, 2012.
Pumawirman et al., "Ultra-narrow-linewidth Al2O3:Er3+ lasers with a wavelength-insensitive waveguide design on a wafer-scale silicon nitride platform," Optics Express, 25:13705-13, Jun. 12, 2017.
Saini et al., "Analysis of Silicon Clad Optical Waveguide for High Extinction Ratio TE/TM Pass Polarizers using Resonant Coupling between Guided Modes and Lossy Modes," IOSR Journal of Electrical and Electronics Engineering, 12:59-64, May-Jun. 2017.
Selvaraja and Sethi, Emerging Waveguide Technology, Chapter 6, Review on Optical Waveguides, pp. 95-129, 2018.
Sun et al., "Experimental demonstration of a hybrid plasmonic transverse electric pass polarizer for a silicon-on-insulator platform," Optics Letters, 37:4814-16, Dec. 1, 2012.
Syms and Cozens, Optical Guided Waves and Devices, Chapter Nine, Channel Waveguide Integrated Optics.
U.S. Appl. No. 16/291,346, filed Mar. 4, 2019, entitled "Polarizers and Polarization Splitters Phase-Matched with a Back-End-of-Line Layer".

\* cited by examiner

TRANSVERSE-ELECTRIC (TE) PASS POLARIZER

BACKGROUND

Field of the Disclosure

Generally, the present disclosure relates to various novel embodiments of a transverse-electric (TE) pass polarizer.

Description of the Related Art

Light is a form of electromagnetic radiation that is comprised of electric and magnetic fields. The electric field and the magnetic field (which are always perpendicular to one another in free space) are oriented transverse to the direction of travel of the light. However, the orientation of the axis of oscillation of the electric field and the axis of oscillation of the magnetic field relative to the direction of travel of the light are different, depending upon the transmission mode of the light. The transmission modes for such light waves include (1) the transverse-electric and magnetic (TEM) mode, (2) the transverse-electric (TE) mode, and (3) the transverse-magnetic (TM) mode. In the TEM mode, both the electric field and the magnetic field are transverse to the direction of travel. In the TE mode, the electric field is transverse to the direction of propagation of the light while the magnetic field is normal to the direction of propagation of the light. In the TM mode, the magnetic field is transverse to the direction of propagation of the light while the electric field is normal to the direction of propagation of the light.

An optical waveguide is a physical structure that guides electromagnetic waves in the optical spectrum. As noted above, unpolarized light consists of wave vibrations in many directions perpendicular to the direction of travel of the light. Light can propagate along a waveguide in various ways, i.e., the TE mode and the TM mode. Waveguides are polarizers that can be used to filter out or block all unwanted vibrations in the unpolarized light. Polarization filters are important elements in semiconductor-based integrated optical circuits, such as signal processing circuits. A waveguide (i.e., a pass polarizer) is used to filter out one polarization component propagating in an optical waveform, e.g., such a waveguide may be used to block substantially all of the TM mode in an incoming TEM mode light thereby allowing only the TE mode of the incoming light to pass through the waveguide. Integrated polarizers must be compatible with the specific waveguide structure. In one illustrative example, a basic TE-pass polarizer consists of a sandwich layer system positioned on top of the waveguide structure. This layer might be formed from a dielectric layer (e.g., yttrium oxide) followed by an absorbing metallic layer (e.g., aluminum). As a result, TM-polarized light is coupled to the surface plasmons of the metallic layer and absorbed. By contrast, the TE polarized light is not strongly influenced by the layer system and passes through the waveguide. The structure and materials used for a semiconductor-based integrated pass polarizer must be consistent with the materials and fabrication methods used to form the remaining parts or components of the integrated circuit product, e.g., the CMOS-based transistors that are part of the IC product. Moreover, as with most integrated circuit products, there is a constant drive to reduce the size or footprint of all elements of any circuit including pass polarizer structures.

The present disclosure is directed to various novel embodiments of a TE pass polarizer for use in integrated optical circuits.

SUMMARY

The following presents a simplified summary of at least one disclosed embodiment in order to provide a basic understanding of some aspects of the subject matter disclosed herein. This summary is not an exhaustive overview of all of the subject matter disclosed herein. It is not intended to identify key or critical elements of the subject matter disclosed herein or to delineate the scope of any claims directed to any of the subject matter disclosed herein. Its sole purpose is to present some concepts in a simplified form as a prelude to the more detailed description that is discussed later in the application.

The present disclosure is generally directed to various novel embodiments of a TE pass polarizer for use in integrated optical circuits. One illustrative TE pass polarizer disclosed herein includes an input/output layer, a first buffer layer positioned above at least a portion of the input/output layer, a layer of ENZ material positioned above at least a portion of the first buffer layer, and a metal-containing capping layer positioned above at least a portion of the layer of ENZ material.

BRIEF DESCRIPTION OF THE DRAWINGS

The disclosure may be understood by reference to the following description taken in conjunction with the accompanying drawings, in which like reference numerals identify like elements, and in which.

Figure 1:
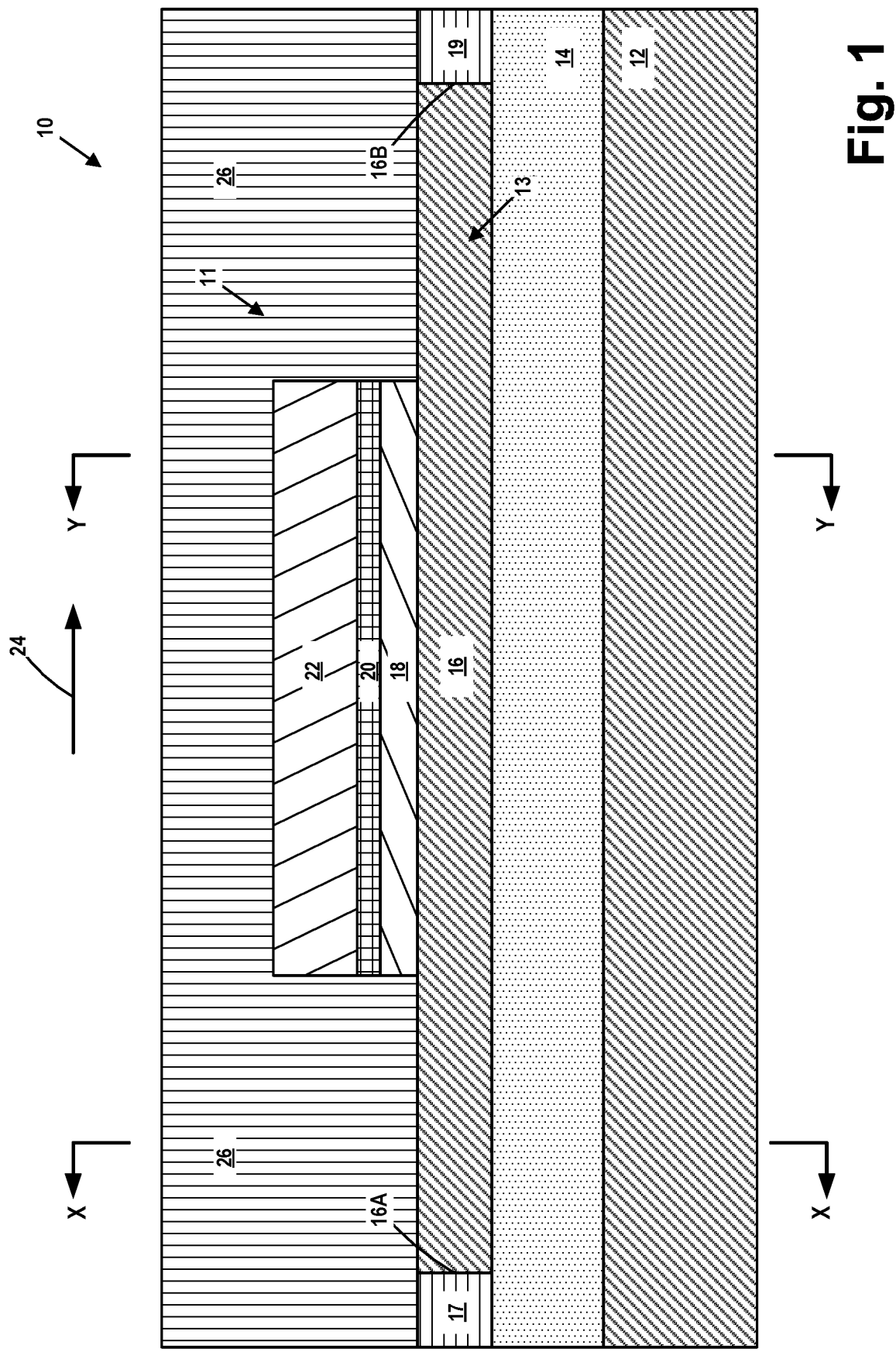
FIGS. 1-16 depict various novel embodiments of a TE pass polarizer for use in integrated optical circuits.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present disclosure will now be described with reference to the attached figures. Various structures, systems and devices are schematically depicted in the drawings for purposes of explanation only and so as to not obscure the present disclosure with details which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase.

Of course, the inventions disclosed herein should not be considered to be limited to the illustrative examples depicted and described herein. The various components and structures of the TE pass polarizer disclosed herein may be formed using a variety of different materials and by performing a variety of known processing techniques, e.g., chemical vapor deposition (CVD), low-pressure chemical vapor deposition (LPCVD), plasma enhanced chemical vapor deposition (PECVD), atomic layer deposition (ALD), a thermal growth, as well as known patterning and etching techniques, etc. The thicknesses of the various layers of material depicted herein may also vary depending upon the particular application. With reference to the attached figures, various illustrative embodiments of the devices disclosed herein will now be described in more detail.

FIGS. 1-4 depict one illustrative embodiment of a TE pass polarizer 10 disclosed herein. FIG. 1 is a cross-sectional view taken through the TE pass polarizer 10 in a direction that is parallel to an optical axis 24 of the TE pass polarizer 10. In the depicted example, the various embodiments of the TE pass polarizers disclosed herein will be fabricated on a semiconductor-on-insulator (SOI) substrate. In general, the SOI structure comprises a base semiconductor substrate 12, a buried insulation layer 14 (sometimes referred to as a "BOX" layer when the insulation layer comprises silicon dioxide) and an active semiconductor layer 13 that is positioned on the buried insulation layer 14. Traditionally, and in one illustrative embodiment, the base semiconductor substrate 12 may comprise silicon, the buried insulation layer 14 may comprise silicon dioxide and the active semiconductor layer 13 may comprise silicon. Of course, the base semiconductor substrate 12 and the active semiconductor layer 13 may be made of any of a variety of different semiconductor materials, and the materials for the base semiconductor substrate 12 and the active semiconductor layer 13 need not be made of the same material in all applications, but such a situation may occur in some applications. Similarly, the buried insulation layer 14 may be comprised of a variety of different insulating materials. The thickness of the layers of the SOI substrate may vary depending upon the particular application. The manner in which such SOI substrates are manufactured are well known to those skilled in the art.

With reference to FIG. 1, in general, this embodiment of the TE pass polarizer 10 comprises a waveguide 11 that includes an input/output layer 16 that is fabricated from the active semiconductor layer 13, an insulator or buffer layer 18, a layer of epsilon-near-zero (ENZ) material 20 and a metal capping layer 22. The input/output layer 16 has an entrance 16A and an exit 16B. Additional insulating material 26 is formed above and around the waveguide 11. The insulating material 26 may be any type of insulating material, e.g., silicon dioxide, or any other material commonly used in back-end-of-line (BEOL) manufacturing processes.

Although the insulating material 26 is simplistically depicted as being a single layer of material, in practice, the insulating material 26 may comprise several layers of material. As will be appreciated by those skilled in the art, the insulating material 26 and the buried insulation layer 14 function as cladding layers for the waveguide 11. The TE pass polarizer 10 may be operatively coupled to schematically depicted components 17, 19 of an optical circuit. In one illustrative example, the component 17 may be a silicon or nitride based waveguide or silicon or nitride based edge coupler connecting with an external optical field with both TE and TM polarizations, etc., while the component 19 may be another silicon or nitride based waveguide or other passive devices working for TE polarization, or active components such as modulators and photodetectors. Also depicted in FIG. 1 are locations where various cross-sectional views depicted in the attached drawings are taken. More specifically, the view X-X is a cross-sectional view taken at a location between the entrance 16A of the input/output layer 16 and the location where the other material layers of the waveguide 11 are positioned above the input/output layer 16, while the view Y-Y is a cross-sectional view taken through all of the material layers of the waveguide 11.

The TE pass polarizer 10 receives a magnetic wave (i.e., light) from the component 17 via the entrance 16A of the input/output layer 16 and transmits substantially only TE mode light to the component 19 via the exit 16B of the input/output layer 16. In one illustrative example, the light received from the component 17 may comprise both TE and TM polarization modes. In other embodiments, depending upon the particular application, the incoming light from the component 17 may be substantially free of the TM polarization mode. In general, irrespective of the composition and characteristics of the incoming magnetic wave received from the component 17, the TE pass polarizer 10 is adapted to allow substantially only the TE mode of the incoming light to pass through to the component 19, as substantially all of the other components of the entering light are substantially absorbed or attenuated within the TE pass polarizer 10.

The thicknesses of the materials of the waveguide 11 as well as their other lateral dimensions may vary depending upon the particular application. In one illustrative embodiment, the input/output layer 16 may be comprised of silicon and it may have a thickness of about 20-500 nm. In other cases, the input/output layer 16 may be made of other materials such as, for example, silicon nitride (SiN), SiON, AlN, a III-V material or a polymer, etc. The buffer layer 18 may have a thickness of about 20-800 nm, the layer of ENZ material 20 may have a thickness of about 1-200 nm, and the metal capping layer 22 may have a thickness of about 10-300 nm. The buffer layer 18 may be comprised of a variety of different materials, e.g., silicon nitride ($Si_3N_4$ n=~2 @ 1.31 μm, 1.55 μm), silicon dioxide ($SiO_2$ n=1.45 @ 1.31 μm, 1.55 μm), SiON, $HfO_2$ (n=2.0754 @ 1.31 μm; n=2.0709 @ 1.55 μm), $ZrO_2$ (n=2.1155 @ 1.31 μm; n=2.1103 @ 1.55 μm), AlN, $TiO_2$ (n=2.4622 @ 1.31 μm; n=2.4538 @1.55 μm), ZnO (n=1.9318 @ 1.31 μm; n=1.9267 @ 1.55 μm), $Al_2O_3$ (n=1.7503 @ 1.31 μm; 1.7462 @ 1.55 μm), MgO (n=1.7178 @ 1.31 μm; 1.7146 @ 1.55 μm), $CaF_2$ (n=1.4272 @ 1.31 μm; 1.4260 @ 1.55 μm), OMCTS (Si-COH) (n=1.406 @ 1.31 μm, 1.55 μm), $MgF_2$ (n=1.3718 @ 1.31 μm; 1.3705 @ 1.55 μm), a polymer, etc. (where "n" is the refractive index).

As will be appreciated by those skilled in the art after a complete reading of the present application, the function of the buffer layer 18 is to, among other things, separate the materials of the waveguide that have a relatively higher index of refraction from one another and/or to separate the layer of ENZ material 20 from the metal capping layer 22 and/or the input/output layer 16. In the example depicted in FIG. 1, the buffer layer 18 is used to separate the layer of ENZ material 20 from the input/output layer 16. Additional embodiments of the waveguides disclosed herein (discussed below) include additional buffer layers that may be made of different materials. Including one or more of such buffer layers in the waveguides disclosed herein enables the waveguide to achieve relatively strong confinement of the light near these buffer layer(s) (with high intensity) while maintaining a reasonable loss, i.e., the light is confined at least partially in the buffer layer(s) (with a relatively lower index of refraction) instead of all of the light being confined in the metal capping layer 22.

As used herein and in the attached claims, the layer of ENZ material 20 shall be understood to be a material having a relative permittivity that falls within the range of −30-+30 (for both real and imaginary parts of the relative permittivity as relative permittivity is a complex value) at the frequency of interest. Such ENZ materials exhibit a near-zero index of refraction at the frequency of interest. For example, the layer of ENZ material 20 may include 2D materials such as graphene, TiN, heavily-doped, narrow band-gap semiconductor materials such as InAsSb, a topical insulator such as BSTS ($Bi_{1.5}Sb_{0.5}Te_{1.8}Se_{1.2}$) or a transparent conducting oxide such as AZO, ITO, etc. The metal capping layer 22 may be comprised of any conductive metal-containing material, e.g., copper, aluminum, tungsten, a noble metal, any CMOS compatible conductive material, etc.

Figure 2:
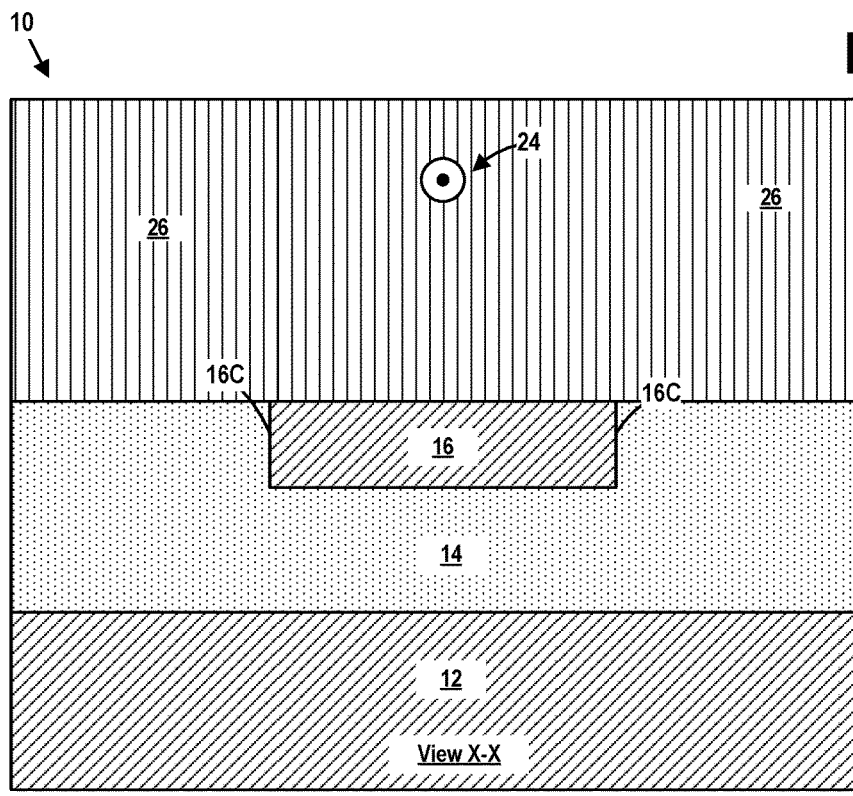
Figure 3:
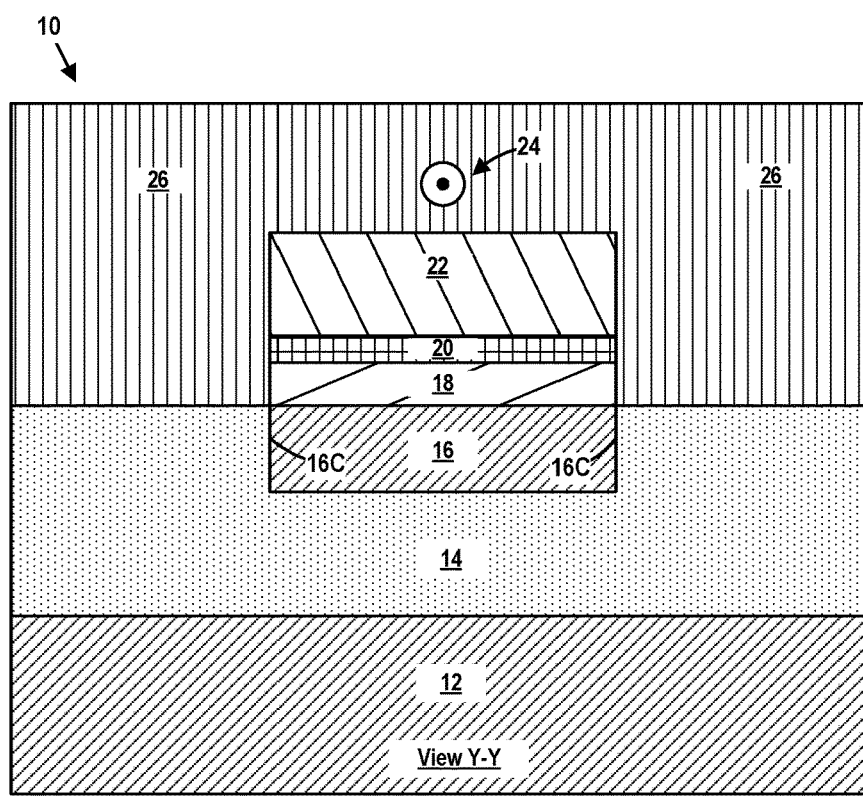

In terms of fabrication, the TE pass polarizer 10 may be fabricated using known manufacturing techniques. For example, in one illustrative process flow, the active semiconductor layer 13 of the SOI substrate may be patterned to define the input/output layer 16 of the desired length (left to right) and lateral width (into and out of the plane of the drawing page of FIG. 1) by performing known masking and etching techniques. The lateral width of various layers discussed herein is to be understood to be a dimension of the layer of material in a direction that is transverse to the optical axis 24 of the pass polarizers disclosed herein. As shown in FIGS. 2 and 3, the input/output layer 16 has a lateral width defined by its lateral sidewalls 16C. Thereafter, at least portions of the optical components 17, 19 may be fabricated. At that point, the buffer layer 18 may be blanket-deposited across the substrate on the input/output layer 16. Next, the layer of ENZ material 20 may be blanket deposited on the buffer layer 18. At that point, a patterned etch mask (not shown) may be formed above the layer of ENZ material 20 and one or more etching processes may be performed to pattern the layer of ENZ material 20 and the buffer layer 18. In the example depicted in FIG. 3, the buffer layer 18 and the layer of ENZ material 20 have substantially the same lateral width as that of the input/output layer 16. In one illustrative example where the metal capping layer 22 is made of copper, a portion of the insulating material 26 may be formed on the substrate such that it covers the layer of ENZ material 20. At that point, a damascene process may be performed to form the metal capping layer 22 on the upper surface of the layer of ENZ material 20. Thereafter, additional insulating material 26 may be formed above the metal capping layer 22. In other cases where the metal capping layer 22 is made of a material that may be readily etched, then it can be blanket-deposited above the blanket layer of ENZ material 20. At that point, a patterned etch mask (not shown) may be formed above the deposited layer of metal capping material. Then, one or more etching processes may be performed to remove portions of the metal capping layer 22, the layer of ENZ material 20 and the buffer layer 18.

Of course, as will be appreciated by those skilled in the art after a complete reading of the present application, the lateral width and thickness of any of the layers of material within the waveguide 11 (including the input/output layer 16) are independent with respect to the lateral width and/or thickness of any other layer in the waveguide 11 (including the input/output layer 16). For example, the lateral width of the buffer layer 18 can be equal to, greater than or less than the lateral width of the input/output layer 16. In the example depicted in FIG. 3, all of the material layers of the waveguide 11 (including the input/output layer 16) have substantially the same lateral width.

Figure 4:
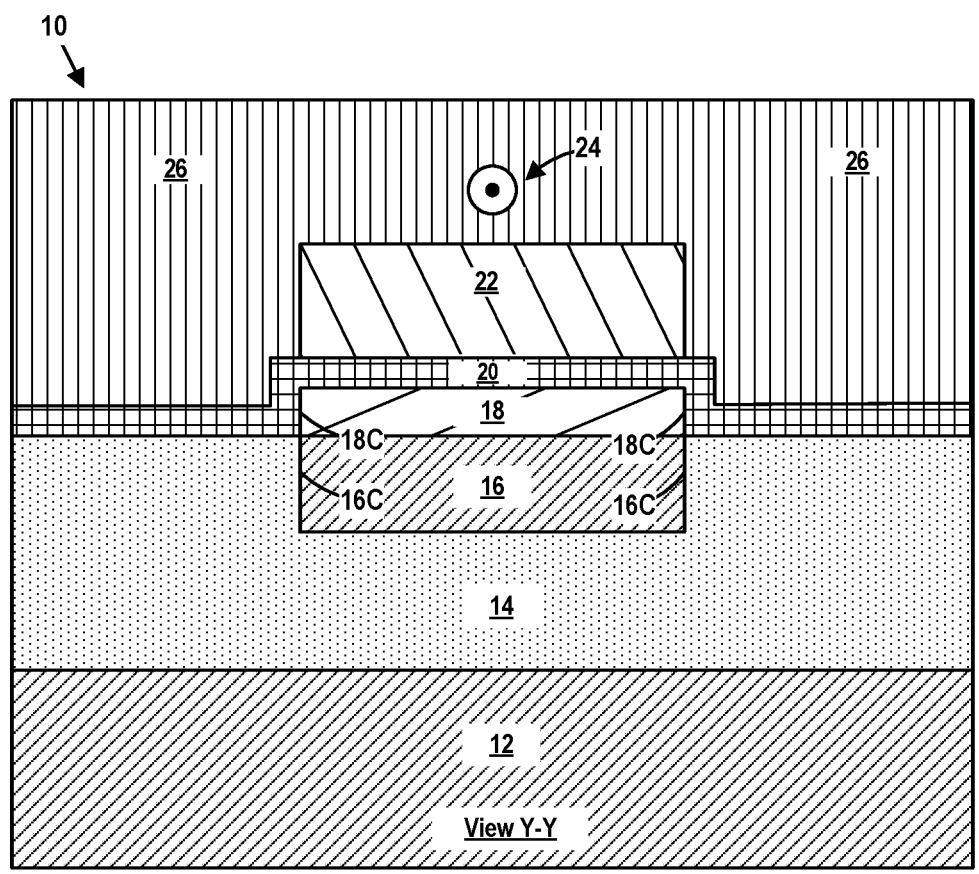

FIG. 4 depicts an embodiment of the TE pass polarizer 10 wherein the layer of ENZ material 20 has a lateral width that is greater than the lateral width of all of the other layers in the waveguide 11. In one illustrative process flow, the TE pass polarizer 10 may be fabricated as follows. As before, the active semiconductor layer 13 of the SOI substrate may be patterned to define the input/output layer 16. Thereafter, at least portions of the optical components 17, 19 may be fabricated. At that point, the buffer layer 18 may be blanket-deposited across the substrate on the input/output layer 16 and patterned to the lateral width shown in FIG. 4. Thereafter, a conformal deposition process may be performed to form a conformal layer of ENZ material 20 on the buffer layer 18. Note that, in one illustrative embodiment, the conformal layer of ENZ material 20 is positioned on and in contact with the upper surface of the buffer layer 18 as well as on and in contact with the opposing lateral side surfaces 18C of the layer of silicon nitride. At that point, in the illustrative example where the metal capping layer 22 is made of copper, the above-described damascene process may be performed to form the metal capping layer 22 on the upper surface of the conformal layer of ENZ material 20. Thereafter, additional insulating material 26 may be formed above the metal capping layer 22.

Figure 5:
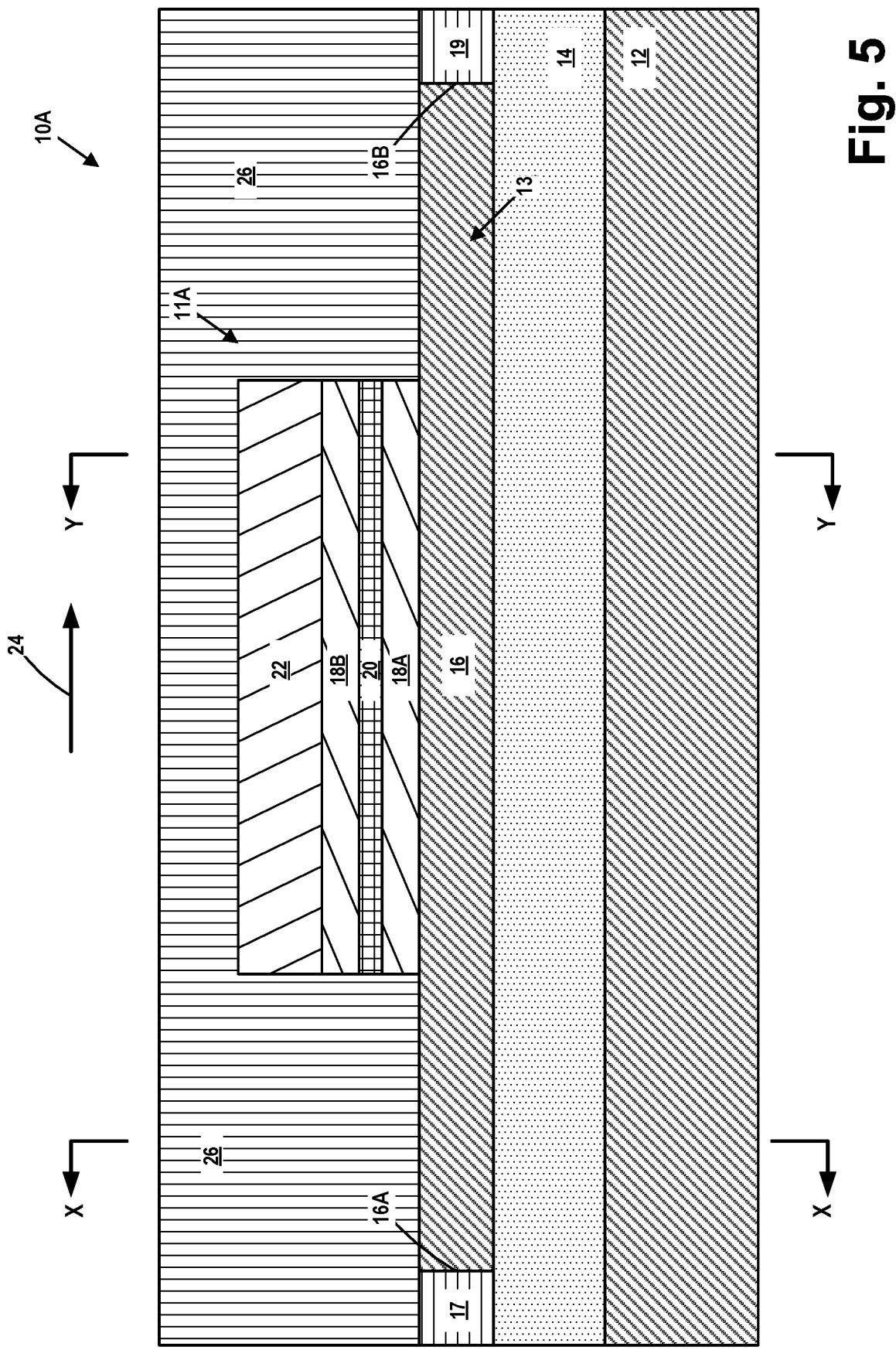
Figure 6:
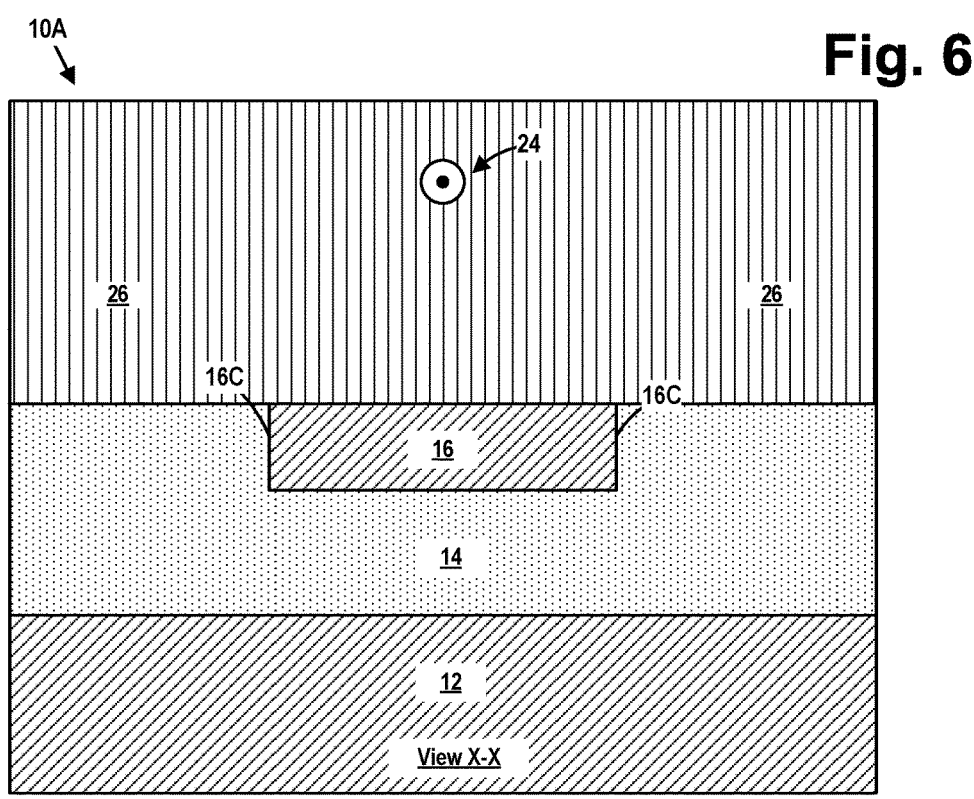
Figure 7:
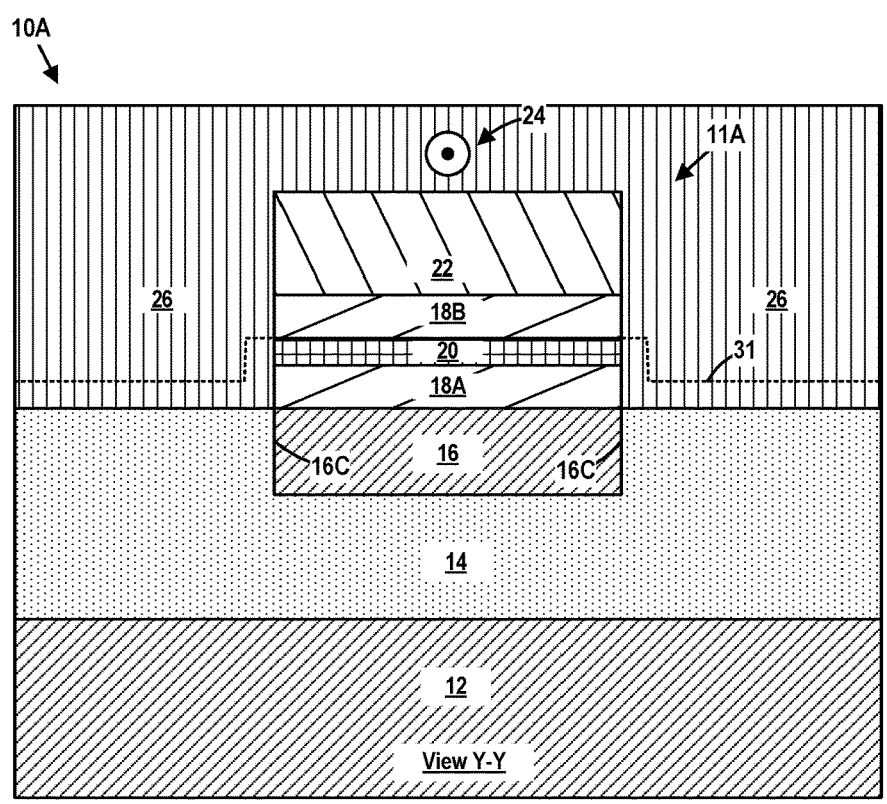

FIGS. 5-7 depict another illustrative embodiment of a TE pass polarizer 10A disclosed herein. FIG. 5 is a cross-sectional view taken through the TE pass polarizer 10A in a direction that is parallel to an optical axis 24 of the TE pass polarizer 10A. This embodiment of the TE pass polarizer 10A includes many of the previously described structures and materials, as reflected by the use of common reference numbers. With reference to FIG. 5, in general, this embodiment of the TE pass polarizer 10A comprises a waveguide 11A that includes the above-described input/output layer 16, first and second layers of the above-described buffer layer 18 (referenced individually by the numerals 18A, 18B and collectively referenced using the numeral 18), the above-described layer of ENZ material 20 and the above-described metal capping layer 22. The layer of ENZ material 20 is positioned between the first and second buffer layers 18A, 18B. The first buffer layer 18A is formed on the input/output layer 16, while the metal capping layer 22 is formed on the second buffer layer 18B.

As before, the input/output layer 16 has an entrance 16A and an exit 16B. The above-described insulating material 26 is formed above and around the waveguide 11A. As before, the TE pass polarizer 10A may be operatively coupled to schematically depicted and above-described components 17, 19 of an optical circuit. Also depicted in FIG. 5 are locations where various cross-sectional views depicted in the attached drawings are taken. More specifically, the view X-X is a cross-sectional view taken at a location between the entrance 16A of the input/output layer 16 and the location where the other material layers of the waveguide 11A are positioned above the input/output layer 16, while the view Y-Y is a cross-sectional view taken through all of the material layers of the waveguide 11A. As before, the TE pass polarizer 10A is adapted to receive a magnetic wave (i.e., light) from the component 17 via the entrance 16A of the input/output layer 16 and transmits substantially only TE mode light to the component 19 via the exit 16B of the input/output layer 16.

As discussed above, the thicknesses of the materials of the waveguide 11A as well as their other lateral dimensions may vary depending upon the particular application. In one illustrative embodiment, the first and second buffer layers 18A, 18B may have substantially the same thickness, but that may not be the case in all applications. As before, the lateral width and thickness of any of the layers of material within the waveguide 11A (including the input/output layer 16) are independent with respect to the lateral width and/or thickness of any other layer of material in the waveguide 11A (including the input/output layer 16). For example, the lateral width of the first or second buffer layer 18A, 18B can be equal to, greater than or less than the lateral width of the input/output layer 16. In the example depicted in FIG. 7 all of the layers of material of the waveguide 11A have substantially the same lateral width. Additionally, in other variations, the layer of ENZ material 20 may also be formed as a conformal layer of material, as reflected by the dashed line 31. Moreover, in this embodiment, the first and second buffer layers 18A, 18B may be made of the same material, but that may not be the case in all applications. In terms of fabrication, the TE pass polarizer 10A may be fabricated using the techniques described above with respect to the previous embodiment.

Figure 8:
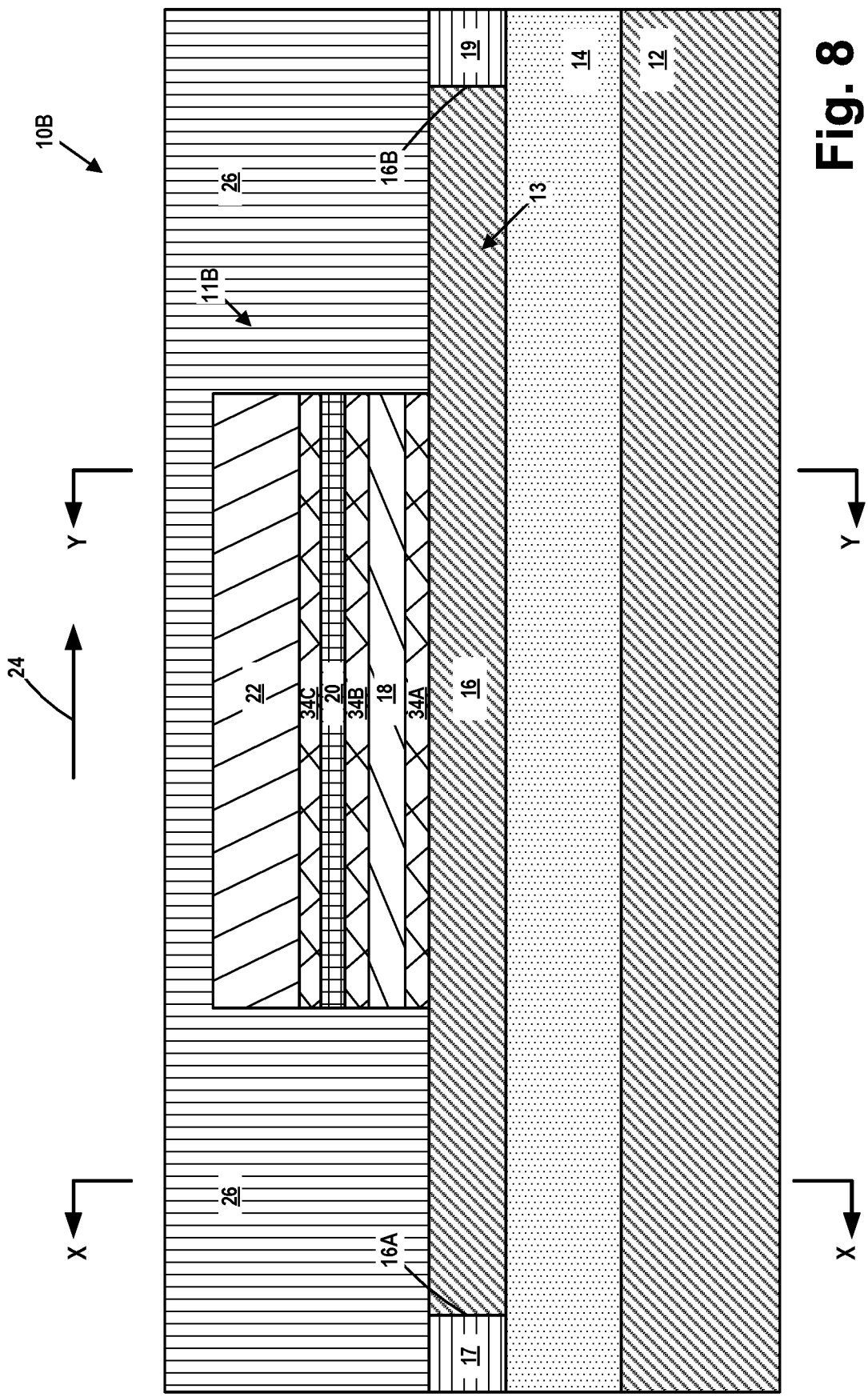
Figure 9:
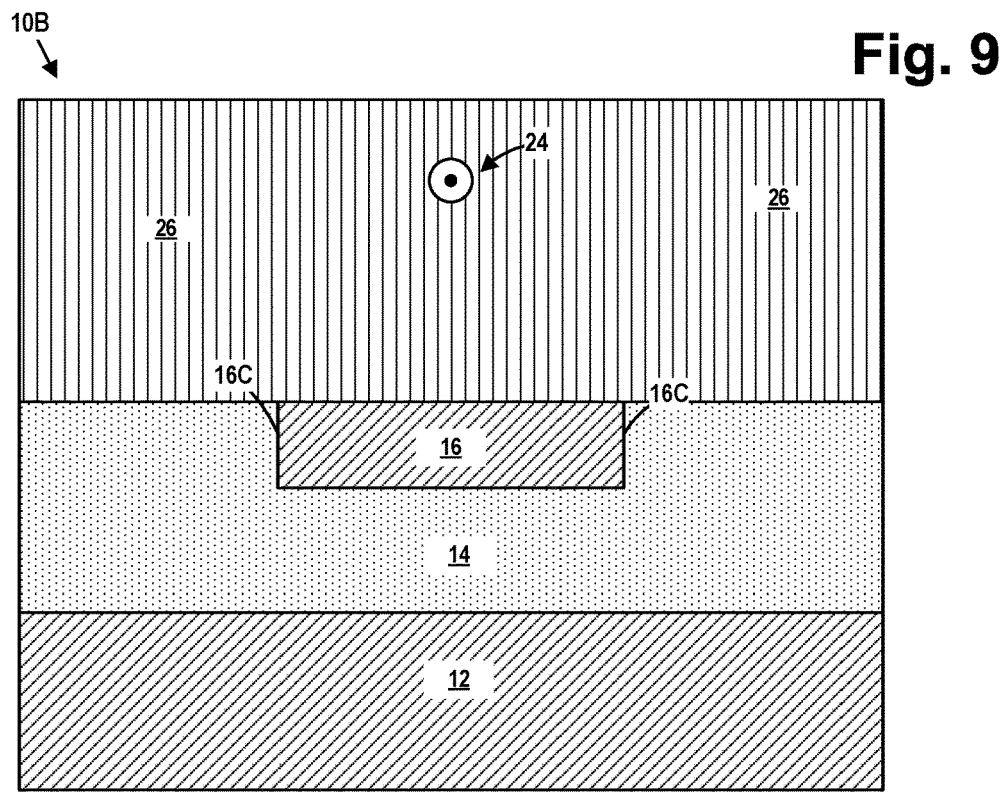
Figure 10:
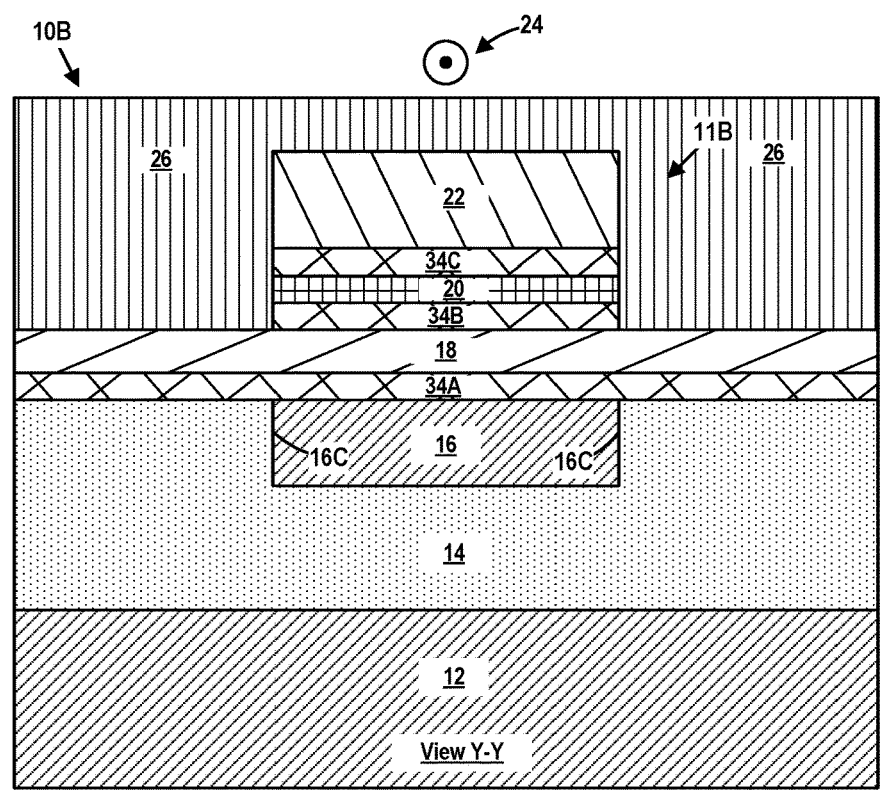

FIGS. 8-11 depict yet another illustrative embodiment of a TE pass polarizer 10B disclosed herein. FIG. 8 is a cross-sectional view taken through the TE pass polarizer 10B in a direction that is parallel to an optical axis 24 of the TE pass polarizer 10B. This embodiment of the TE pass polarizer 10B includes many of the previously described structures and materials, as reflected by the use of common reference numbers. With reference to FIG. 8, in general, this embodiment of the TE pass polarizer 10B comprises a waveguide 11B that includes the above-described input/output layer 16, the above-described first buffer layer 18, the above-described layer of ENZ material 20 and the above-described metal capping layer 22. This embodiment also comprises three additional buffer layers 34A, 34B, 34C, respectively (collectively referenced using the numeral 34). The buffer layers 34 may be comprised of a variety of different materials, e.g., silicon dioxide, $Al_2O_3$, $CaF_2$, $MgF_2$, a material having a refractive index within the range of about 1.4-1.8, etc. In some applications, all of the buffer layers 34 may be made of the same material, but that may not be the case in all applications. Additionally, the thickness of the buffer layers 34 may range from about 1-100 nm. In some applications, the thickness of all of the buffer layers 34 may be substantially the same, but that may not be the case in all applications. In one particular embodiment, one or more of the buffer layers 34 may be made from a material that is different from the material selected for the buffer layer 18.

As depicted, in this embodiment, the buffer layer 18 is positioned between the first and second buffer layers 34A, 34B, respectively. The layer of ENZ material 20 is positioned between the second and third buffer layers 34B, 34C, respectively. The first buffer layer 34A is formed on the input/output layer 16, while the metal capping layer 22 is formed on the third buffer layer 34C. Also depicted in FIG. 8 are locations where various cross-sectional views depicted in the attached drawings are taken. More specifically, the view X-X is a cross-sectional view taken at a location between the entrance 16A of the input/output layer 16 and the location where the other material layers of the waveguide 11B are positioned above the input/output layer 16, while the view Y-Y is a cross-sectional view taken through all of the material layers of the waveguide 11B. As before, the TE pass polarizer 10B is adapted to receive a magnetic wave (i.e., light) from the component 17 via the entrance 16A of the input/output layer 16 and transmits substantially only TE mode light to the component 19 via the exit 16B of the input/output layer 16.

Figure 11:
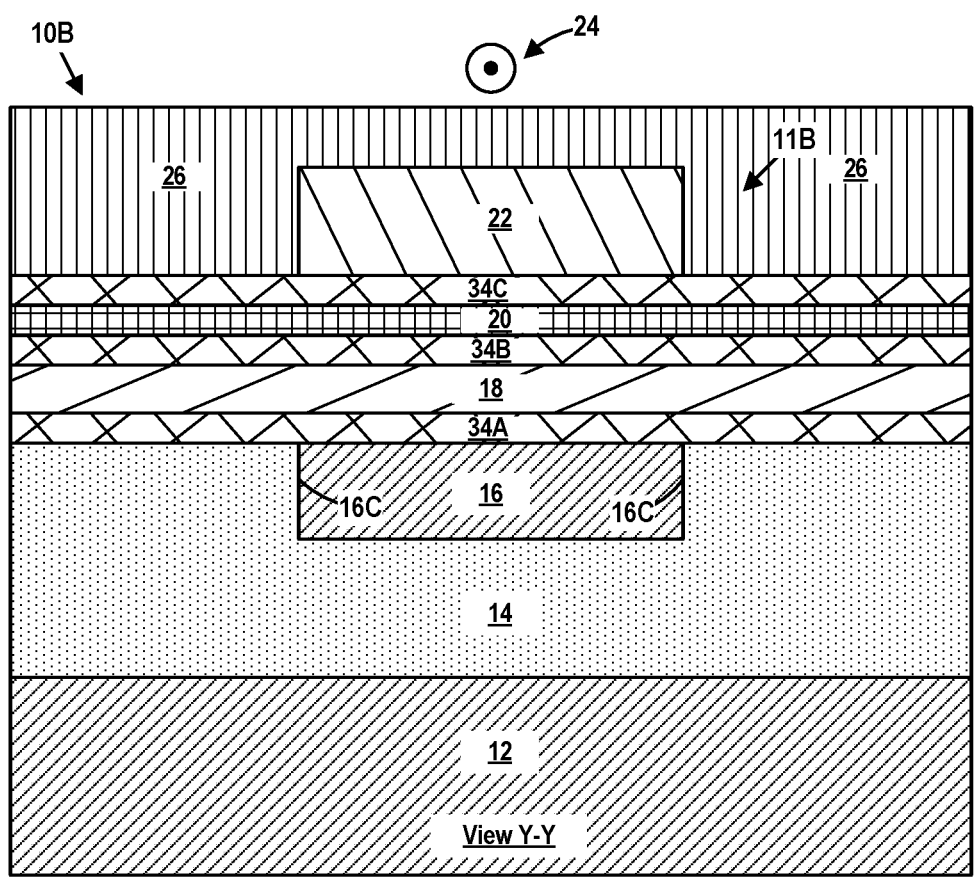

As with the previous embodiments, the lateral width and thickness of any of the layers of material within the waveguide 11B (including the input/output layer 16) are independent with respect to the lateral width and/or thickness of any other layer in the waveguide 11B (including the input/output layer 16). For example, the lateral width of the buffer layer 18 can be equal to, greater than or less than the lateral width of the input/output layer 16. In the example depicted in FIG. 10, the input/output layer 16, the second buffer layer 34B, the layer of ENZ material 20, the third buffer layer 34C, and the metal capping layer 22 of the waveguide 11B all have substantially the same lateral width. However, the lateral widths of the first buffer layer 34A and the buffer layer 18 are greater than the lateral width of the other layers of material in the waveguide 11B. FIG. 11 depicts an alternative embodiment of the waveguide 11B wherein the input/output layer 16 and the metal capping layer 22 have substantially the same lateral width while all of the other layers of material in the waveguide 11B have a lateral width that is significantly greater than the lateral width of the input/output layer 16. In terms of fabrication, the TE pass polarizer 10B may be fabricated using the techniques described above with respect to the previous embodiments.

Figure 12:
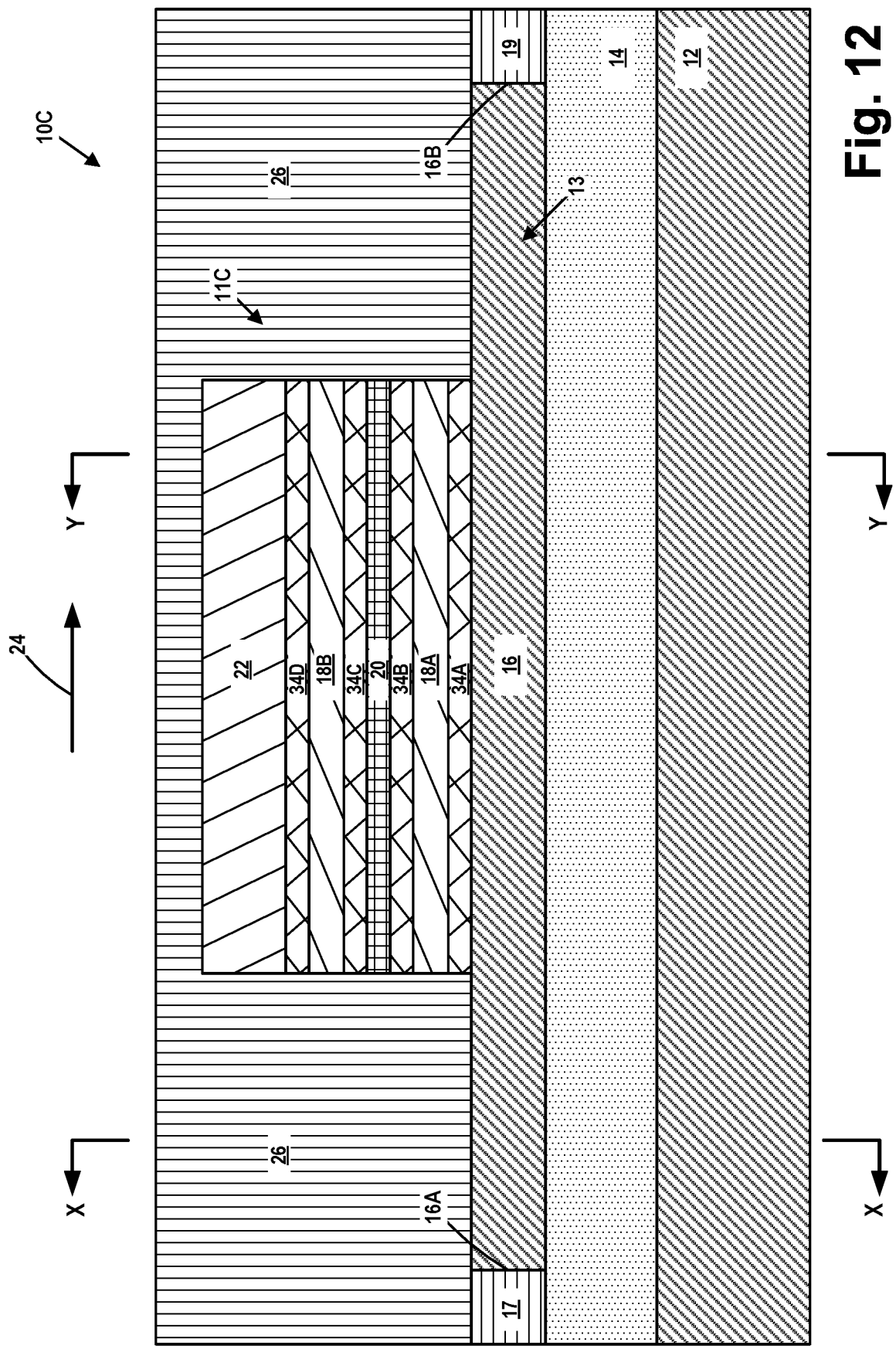
Figure 13:
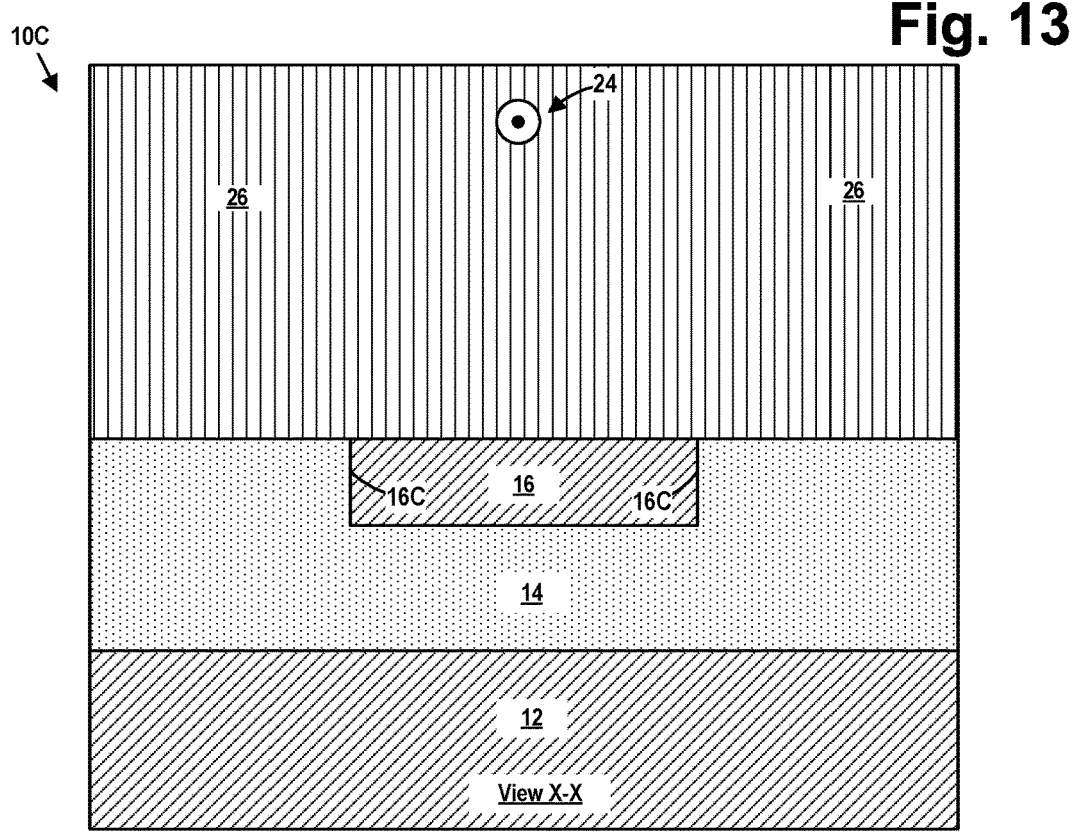
Figure 14:
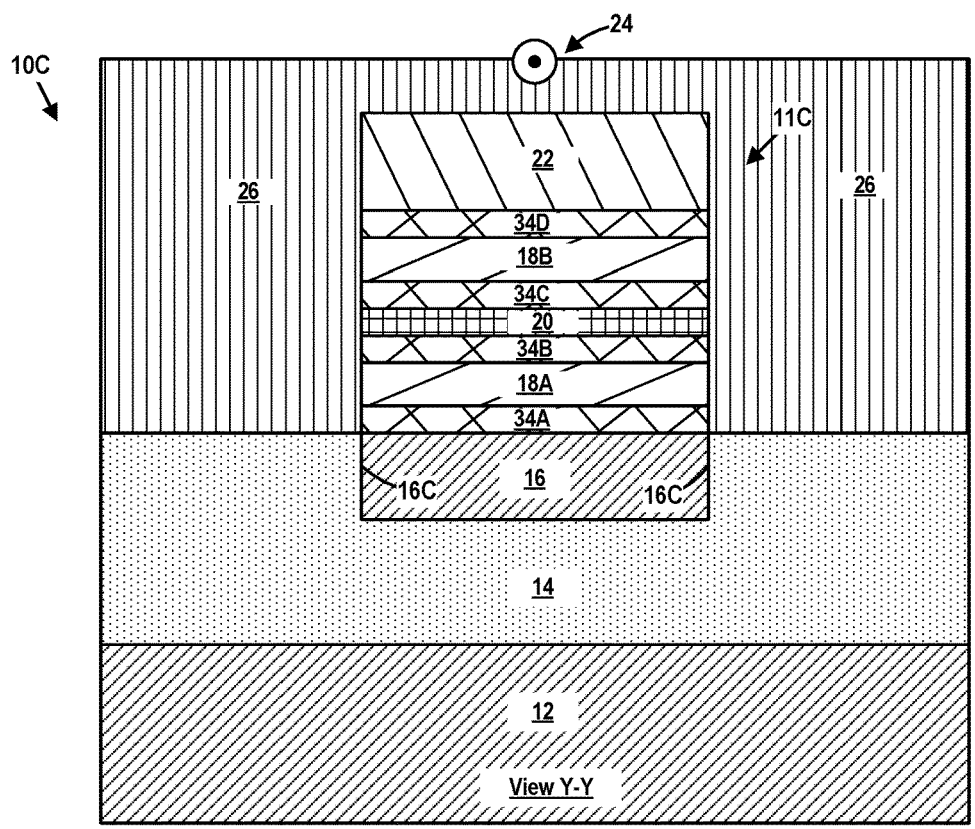
Figure 15:
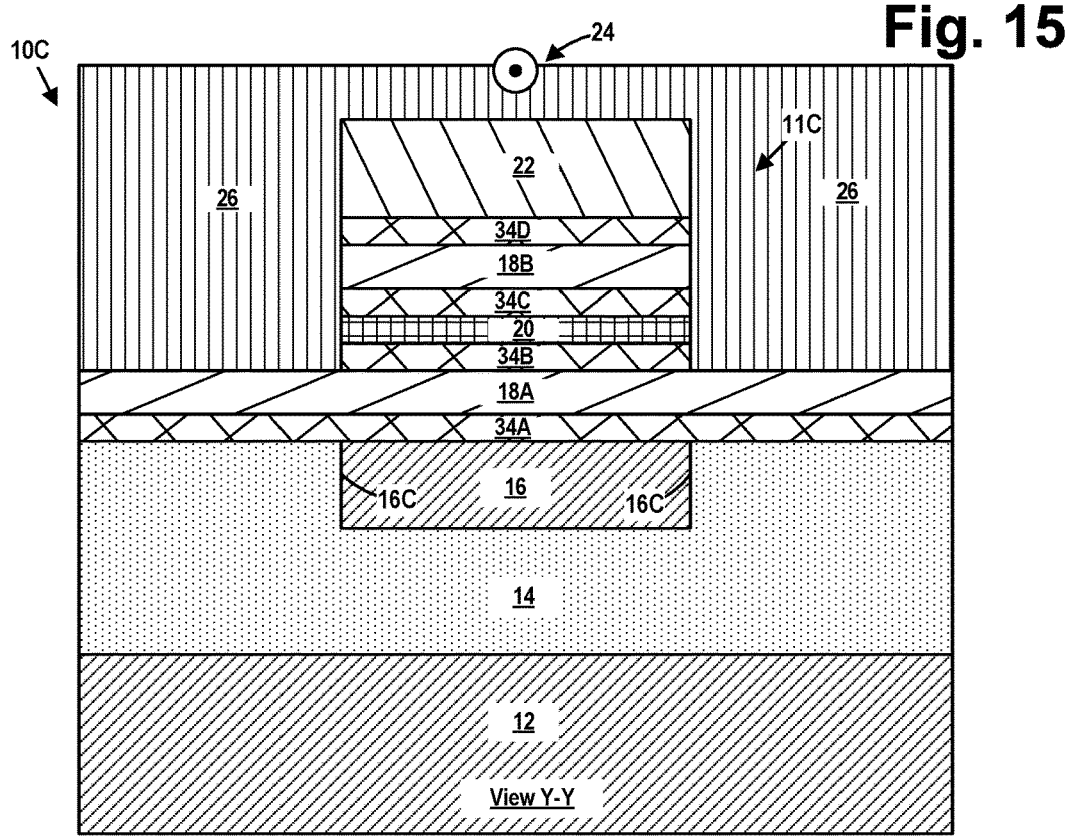

FIGS. 12-16 depict yet another illustrative embodiment of a TE pass polarizer 10C disclosed herein. FIG. 12 is a cross-sectional view taken through the TE pass polarizer 10C in a direction that is parallel to an optical axis 24 of the TE pass polarizer 10C. This embodiment of the TE pass polarizer 10C includes many of the previously described structures and materials. With reference to FIG. 12, in general, this embodiment of the TE pass polarizer 10C comprises a waveguide 11C that includes the above-described input/output layer 16, the previously-described first and second buffer layers 18A, 18B, respectively, the above-described layer of ENZ material 20, four of the above-described buffer layers 34A, 34B, 34C, 34D, respectively (collectively referenced using the numeral 34) and the above-described metal capping layer 22. As depicted in this embodiment, the first buffer layer 18A is positioned between the buffer layers 34A, 34B, respectively. The layer of ENZ material 20 is positioned between the buffer layers 34B, 34C. The second buffer layer 18B is positioned between the buffer layers 34C, 34D, respectively. The buffer layer 34A is formed on and in contact with the input/output layer 16 while the metal capping layer 22 is formed on and in contact with the buffer layer 34D. Also depicted in FIG. 12 are locations where various cross-sectional views depicted in the attached drawings are taken. More specifically, the view X-X is a cross-sectional view taken at a location between the entrance 16A of the input/output layer 16 and the location where the other material layers of the waveguide 11C are positioned above the input/output layer 16, while the view Y-Y is a cross-sectional view taken through all of the material layers of the waveguide 11C. As before, the TE pass polarizer 10C is adapted to receive a magnetic wave (i.e., light) from the component 17 via the entrance 16A of the input/output layer 16 and transmits substantially only TE mode light to the component 19 via the exit 16B of the input/output layer 16.

Figure 16:
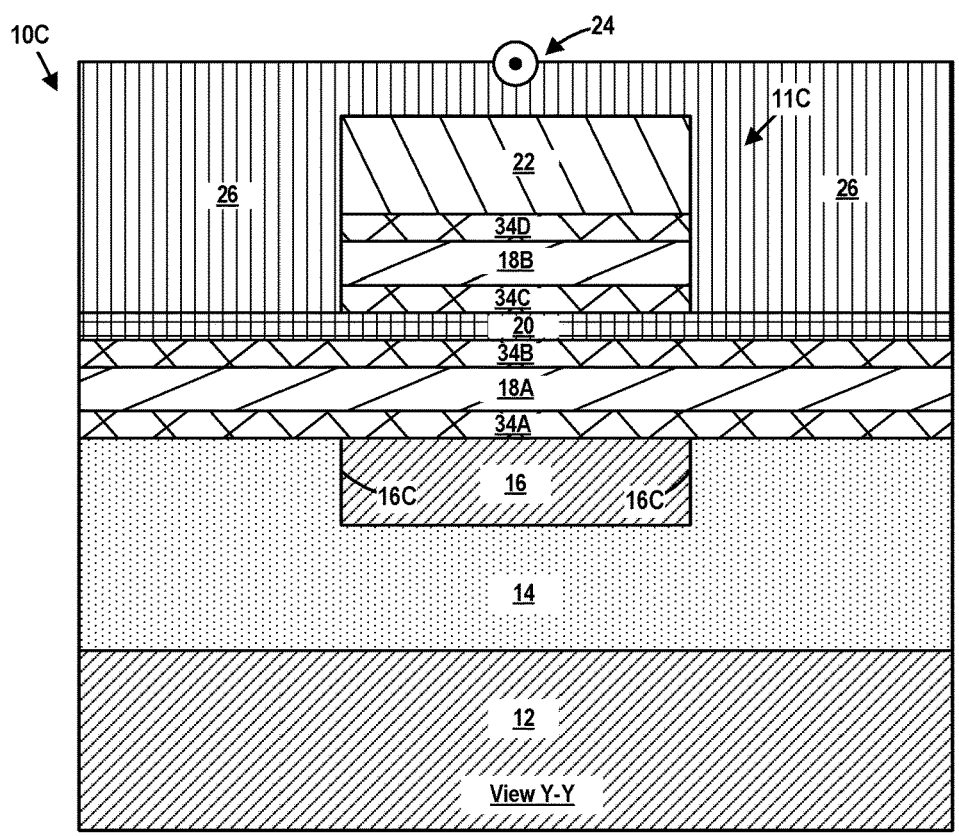

As with the previous embodiments, the lateral width and thickness of any of the layers of material within the waveguide 11C (including the input/output layer 16) are independent with respect to the lateral width and/or thickness of any other layer in the waveguide 11C (including the input/output layer 16). For example, the lateral width of the buffer layer 18A can be equal to, greater than or less than the lateral width of the input/output layer 16. In the example depicted in FIG. 14, all of the layers of material of the waveguide 11C have substantially the same lateral width. In the example depicted in FIG. 15, the lateral width of the buffer layer 34A and the first buffer layer 18A are greater than the lateral width of the other layers of material in the waveguide 11C. FIG. 16 depicts an alternative embodiment of the waveguide 11C wherein the input/output layer 16, the buffer layer 34C, the second buffer layer 18B, the buffer layer 34D and the metal capping layer 22 have substantially the same lateral width while all of the other layers of material in the waveguide 11C have a lateral width that is significantly greater than the lateral width of the input/output layer 16. In terms of fabrication, the TE pass polarizer 10C may be fabricated using the techniques described above with respect to the previous embodiments.

As will be appreciated by those skilled in the art, there are several novel waveguides disclosed herein. For example, one illustrative TE pass polarizer disclosed herein includes a base semiconductor substrate 12, an input/output layer 16 positioned above the base semiconductor substrate 12, an insulation material 14 positioned between the input/output layer 16 and the base semiconductor layer 12, a first buffer layer 18 positioned above at least a portion of the input/output layer 16, a layer of ENZ material 20 positioned above at least a portion of the first buffer layer 18 and a metal-containing capping layer 22 positioned above at least a portion of the layer of ENZ material 20. In one particularly illustrative embodiment, the first buffer layer 18 is positioned on and in contact with an upper surface of the input/output layer 16, the layer of ENZ material 20 is positioned on and in contact with an upper surface of the first buffer layer 18 and the metal capping layer 22 is positioned on and in contact with an upper surface of the layer of ENZ material 20.

Another illustrative waveguide disclosed herein includes a base semiconductor substrate 12, an input/output layer 16 positioned above the base semiconductor substrate 12, an insulation material 14 positioned between the input/output layer 16 and the base semiconductor layer 12, a first buffer layer 18A positioned above at least a portion of the input/output layer 16, a layer of ENZ material 20 positioned above at least a portion of the first buffer layer 18A, a second buffer layer 18B positioned above at least a portion of the layer of ENZ material 20 and a metal-containing capping layer 22 positioned above at least a portion of the second buffer layer 18B. In one particularly illustrative embodiment, the first buffer layer 18A is positioned on and in contact with an upper surface of the input/output layer 16, the layer of ENZ material 20 is positioned on and in contact with an upper surface of the first buffer layer 18A, the second buffer layer 18B is positioned on and in contact with an upper surface of the layer of ENZ material 20 and the metal capping layer 22 is positioned on and in contact with an upper surface of the second buffer layer 18B. In one very particular embodiment, the first and second buffer layers 18A, 18B are comprised of the same material.

Yet another illustrative waveguide disclosed herein includes a base semiconductor substrate 12, an input/output layer 16 positioned above the base semiconductor substrate 12, an insulation material 14 positioned between the input/output layer 16 and the base semiconductor layer 12, a first buffer layer 34A positioned above at least a portion of the input/output layer 16, a second buffer layer 18 positioned above the first buffer layer 34A, a third buffer layer 34B positioned above the second buffer layer 18, a layer of ENZ material 20 positioned above at least a portion of the third buffer layer 34B, a fourth buffer layer 34C positioned above at least a portion of the layer of ENZ material 20 and a metal-containing capping layer 22 positioned above at least a portion of the fourth buffer layer 34C. In one particularly illustrative embodiment, the first buffer layer 34A is positioned on and in contact with an upper surface of the input/output layer 16, the second buffer layer 18 is positioned on and in contact with an upper surface of the first buffer layer 34A, the third buffer layer 34B is positioned on and in contact with an upper surface of the second buffer layer 18, the layer of ENZ material 20 is positioned on and in contact with an upper surface of the third buffer layer 34B, the fourth buffer layer 34C is positioned on and in contact with an upper surface of the layer of ENZ material 20 and the metal capping layer 22 is positioned on and in contact with an upper surface of the fourth buffer layer 34C. In one very particular embodiment, the first, third and fourth buffer layers 34A, 34B and 34C are comprised of silicon dioxide, while the second buffer layer 18 is comprised of silicon nitride.

A further embodiment of yet another illustrative waveguide disclosed herein includes a base semiconductor substrate 12, an input/output layer 16 positioned above the base semiconductor substrate 12, an insulation material 14 positioned between the input/output layer 16 and the base semiconductor layer 12, a first buffer layer 34A positioned above at least a portion of the input/output layer 16, a second buffer layer 18A positioned above the first buffer layer 34A, a third buffer layer 34B positioned above the second buffer layer 18A, a layer of ENZ material 20 positioned above at least a portion of the third buffer layer 34B, a fourth buffer layer 34C positioned above at least a portion of the layer of ENZ material 20, a fifth buffer layer 18B positioned above the fourth buffer layer 34C, a sixth buffer layer 34D positioned above the fifth buffer layer 18B and a metal-containing capping layer 22 positioned above at least a portion of the sixth buffer layer 34D. In one particularly illustrative embodiment, the first buffer layer 34A is positioned on and in contact with an upper surface of the input/output layer 16, the second buffer layer 18A is positioned on and in contact with an upper surface of the first buffer layer 34A, the third buffer layer 34B is positioned on and in contact with an upper surface of the second buffer layer 18A, the layer of ENZ material 20 is positioned on and in contact with an upper surface of the third buffer layer 34B, the fourth buffer layer 34C is positioned on and in contact with an upper surface of the layer of ENZ material 20, the fifth buffer layer 18B is positioned on and in contact with an upper surface of the fourth buffer layer 34C, the sixth buffer layer 34D is positioned on and in contact with an upper surface of the fifth buffer layer 18B and the metal capping layer 22 is positioned on and in contact with an upper surface of the sixth buffer layer 34D. In one very particular embodiment, the first, third, fourth and sixth buffer layers 34A, 34B, 34C and 34D are comprised of silicon dioxide, while the second and fifth buffer layers 18A, 18B are comprised of silicon nitride.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:
1. A transverse-electric (TE) pass polarizer, comprising:
a base semiconductor substrate;
an input/output layer positioned above the base semiconductor substrate;
an insulation material positioned between the input/output layer and the base semiconductor layer;
a first buffer layer positioned above at least a portion of the input/output layer;
a second buffer layer positioned between the input/output layer and the first buffer layer;
a layer of epsilon-near-zero (ENZ) material positioned above at least a portion of the first buffer layer;
a third buffer layer positioned between the first buffer layer and the layer of ENZ material;
a metal-containing capping layer positioned above at least a portion of the layer of ENZ material; and
a fourth buffer layer positioned between the layer of ENZ material and the metal-containing capping layer.

2. The TE pass polarizer of claim 1, wherein the input/output layer comprises one of silicon, silicon nitride, SiON, AlN or a polymer, the layer of ENZ material comprises one of graphene, TiN, InAsSb, BSTS ($Bi_{1.5}Sb_{0.5}Te_{1.8}Se_{1.2}$), AZO or ITO and the first buffer layer comprises one of SiON, $Si_3N_4$, $SiO_2$, $HfO_2$, $ZrO_2$, AlN, $TiO_2$, ZnO, $Al_2O_3$, MgO, $CaF_2$, SiCOH, $MgF_2$ or a polymer.

3. The TE pass polarizer of claim 1, wherein the TE pass polarizer comprises an optical axis and wherein the input/output layer, the first buffer layer, the layer of ENZ material and the metal-containing capping layer each comprise a lateral width in a direction that is transverse to a direction corresponding to the optical axis, wherein the lateral width of the input/output layer, the first buffer layer, the layer of ENZ material and the metal-containing capping layer are all substantially the same.

4. The TE pass polarizer of claim 1, wherein the layer of ENZ material is a conformal layer of material that engages a top surface and opposing lateral sidewalls of the first buffer layer.

5. The TE pass polarizer of claim 1, wherein the first buffer layer and the fourth buffer layer have substantially the same thickness and are comprised of the same material.

6. The TE pass polarizer of claim 5, wherein the layer of ENZ material is a conformal layer of material that engages a top surface and opposing lateral sidewalls of the first buffer layer.

7. The TE pass polarizer of claim 1, wherein the layer of ENZ material is positioned on and in contact with an upper surface of the third buffer layer, the fourth buffer layer is positioned on and in contact with an upper surface of the layer of ENZ material and the metal-containing capping layer is positioned on and in contact with an upper surface of the fourth buffer layer.

8. The TE pass polarizer of claim 1, further comprising fifth and sixth buffer layers, wherein the fifth buffer layer is positioned between the layer of ENZ material and the fourth buffer layer, and the sixth buffer layer is positioned between the fourth buffer layer and the metal-containing capping layer.

9. The TE pass polarizer of claim 8, wherein the third buffer layer is positioned on and in contact with an upper surface of the input/output layer, the first buffer layer is positioned on and in contact with an upper surface of the third buffer layer, the second buffer layer is positioned on and in contact with an upper surface of the first buffer layer, the layer of ENZ material is positioned on and in contact with an upper surface of the second buffer layer, the fifth buffer layer is positioned on and in contact with an upper surface of the layer of ENZ material, the fourth buffer layer is positioned on and in contact with an upper surface of the fifth buffer layer, the sixth buffer layer is positioned on and in contact with an upper surface of the fourth buffer layer and the metal-containing capping layer is positioned on and in contact with an upper surface of the sixth buffer layer.

10. The TE pass polarizer of claim 8, wherein the first and fourth buffer layers comprise silicon nitride and the second, third, fifth and sixth buffer layers comprise silicon dioxide.

11. The TE pass polarizer of claim 1, wherein the second buffer layer is positioned on and in contact with an upper surface of the input/output layer, the first buffer layer is positioned on and in contact with an upper surface of the second buffer layer, the third buffer layer is positioned on and in contact with an upper surface of the first buffer layer, the layer of ENZ material is positioned on and in contact with an upper surface of the third buffer layer, the fourth buffer layer is positioned on and in contact with an upper surface of the layer of ENZ material and the metal-containing capping layer is positioned on and in contact with an upper surface of the fourth buffer layer.

12. The TE pass polarizer of claim 1, wherein the TE pass polarizer comprises an optical axis and wherein the input/output layer, the first buffer layer, the layer of ENZ material, the second, third and fourth buffer layers and the metal-containing capping layer each comprise a lateral width in a direction that is transverse to a direction corresponding to the optical axis, wherein a lateral width of at least one of the first buffer layer, the layer of ENZ material, the second, third and fourth buffer layers and the metal-containing capping layer is greater than the lateral width of the input/output layer.

13. A transverse-electric (TE) pass polarizer, comprising:
a base semiconductor substrate;
an input/output layer positioned above the base semiconductor substrate;
an insulation material positioned between the input/output layer and the base semiconductor layer;
a first buffer layer positioned above at least a portion of the input/output layer;

a second buffer layer positioned above the first buffer layer;

a third buffer layer positioned above the second buffer layer;

a layer of epsilon-near-zero (ENZ) material positioned above at least a portion of the third buffer layer;

a fourth buffer layer positioned above the layer of ENZ material; and a metal-containing capping layer positioned above at least a portion of the fourth buffer layer.

14. The TE pass polarizer of claim 13, wherein the first, third and fourth buffer layers comprise silicon dioxide and the second buffer layer comprises silicon nitride.

15. A transverse-electric (TE) pass polarizer, comprising:
a base semiconductor substrate;

an input/output layer positioned above the base semiconductor substrate;

an insulation material positioned between the input/output layer and the base semiconductor layer;

a first buffer layer positioned above at least a portion of the input/output layer;

a second buffer layer positioned above the first buffer layer;

a third buffer layer positioned above the second buffer layer;

a layer of epsilon-near-zero (ENZ) material positioned above at least a portion of the third buffer layer;

a fourth buffer layer positioned above the layer of ENZ material;

a fifth buffer layer positioned above the fourth buffer layer;

a sixth buffer layer positioned above the fifth buffer layer; and a metal-containing capping layer positioned above at least a portion of the sixth buffer layer.

16. The TE pass polarizer of claim 15, wherein the first, third, fourth and sixth buffer layers comprise silicon dioxide and the second and fifth buffer layers comprise silicon nitride.

17. The TE pass polarizer of claim 15, wherein the TE pass polarizer comprises an optical axis and wherein the input/output layer, the first buffer layer, the layer of ENZ material, the second, third, fourth, fifth, and sixth buffer layers and the metal-containing capping layer each comprise a lateral width in a direction that is transverse to a direction corresponding to the optical axis, wherein a lateral width of at least one of the first buffer layer, the layer of ENZ material, the second, third, fourth, fifth and sixth buffer layers and the metal-containing capping layer is greater than the lateral width of the input/output layer.

18. The TE pass polarizer of claim 15, wherein the input/output layer comprises one of silicon, silicon nitride, SiON, AlN or a polymer, the layer of ENZ material comprises one of graphene, TiN, InAsSb, BSTS ($Bi_{1.5}Sb_{0.5}Te_{1.8}Se_{1.2}$), AZO or ITO and the first buffer layer comprises one of SiON, $Si_3N_4$, $SiO_2$, $HfO_2$, $ZrO_2$, AlN, $TiO_2$, ZnO, $Al_2O_3$, MgO, $CaF_2$, SiCOH, $MgF_2$ or a polymer.

19. The TE pass polarizer of claim 15, wherein the TE pass polarizer comprises an optical axis and wherein the input/output layer, the first buffer layer, the second buffer layer, the third buffer layer, the fourth buffer layer, the layer of ENZ material and the metal-containing capping layer each comprise a lateral width in a direction that is transverse to a direction corresponding to the optical axis, wherein the lateral width of the input/output layer, the first buffer layer, the second buffer layer, the third buffer layer, the fourth buffer layer, the layer of ENZ material and the metal-containing capping layer are all substantially the same.

20. The TE pass polarizer of claim 15, wherein the second buffer layer and the fifth buffer layer have substantially the same thickness and are comprised of the same material.

\* \* \* \* \*